(No Model.) 3 Sheets—Sheet 1.
W. SANDERS.
PHOTOGRAPHIC CAMERA.
No. 488,799. Patented Dec. 27, 1892.
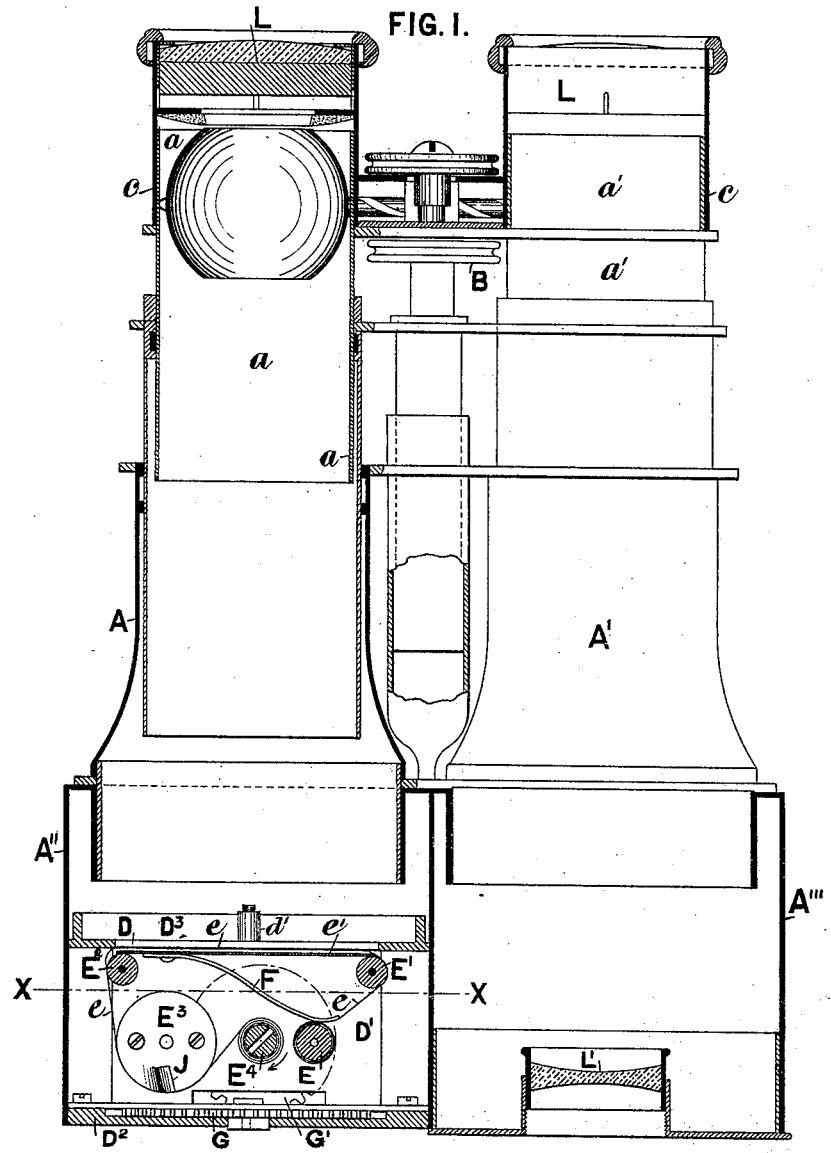
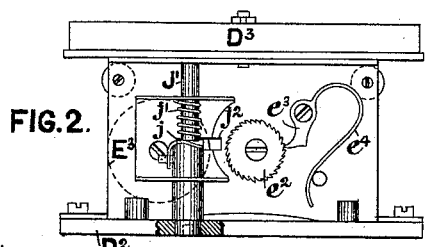
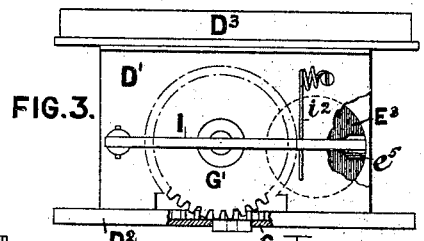
Witnesses
Roscoe C. Trunk
Burnham Kalisch
Inventor
Wm. Sanders
By Clarence P. Ridges
Atty (No Model.) 3 Sheets—Sheet 2.

W. SANDERS.
PHOTOGRAPHIC CAMERA.

No. 488,799. Patented Dec. 27, 1892.

Witnesses
Roscoe C. Coombs
Burnham Kalisch

Inventor
Wm. Sanders,
By Clarence ...

THE NORRIS PETERS CO., PHOTO-LITHO., WASHINGTON, D.C.

(No Model.)  3 Sheets—Sheet 3.

W. SANDERS.
PHOTOGRAPHIC CAMERA.

No. 488,799. Patented Dec. 27, 1892.

UNITED STATES PATENT OFFICE.

WILLIAM SANDERS, OF LIVERPOOL, ENGLAND.

PHOTOGRAPHIC CAMERA.

SPECIFICATION forming part of Letters Patent No. 488,799, dated December 27, 1892.

Application filed March 9, 1891. Serial No. 384,382. (No model.)

*To all whom it may concern:*

Be it known that I, WILLIAM SANDERS, boot manufacturer, a subject of the Queen of Great Britain, residing at Liverpool, in the county of Lancaster, in the Kingdom of England, have invented certain new and useful Improvements in Photographic Cameras, of which the following is a specification.

This invention has for its object a photographic camera formed with two parallel tubes similar to the tubes of a binocular, and either with or without the external appearance of the same. It is applicable for the use of detectives, and owing to its external appearance, can be directed toward a scene or object for the purpose of producing a photographic picture thereof, without suspicion being aroused as regards the real purpose the operator has in view. The apparatus, being of very compact form and easily portable, is also applicable for tourists, surveyors, civil engineers and others. In the examples I am about to describe, a pair of telescopic tubes, having parallel and simultaneous adjustment, are employed, as in an opera or other like binocular glass, one of which is adapted for focusing, and the other for receiving the sensitized surface or plate which is exposed to the actinic action of light. The apparatus is so arranged, that, when an object is focused by the one tube, the sensitized surface in the other tube is in the proper focus to receive the image of such object.

Figure 4:
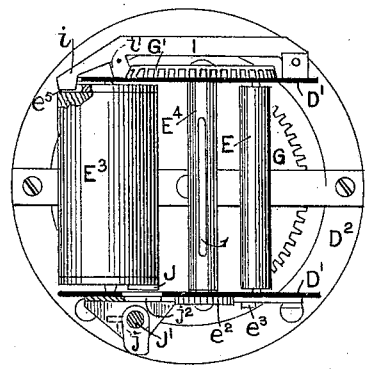
Figure 5:
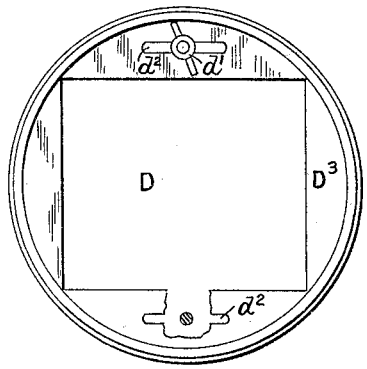
Figure 6:
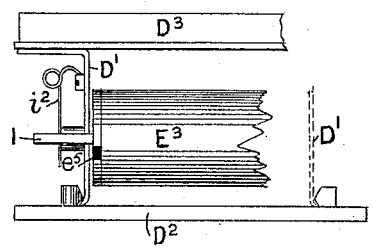
Figure 7:
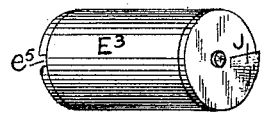
Figure 8:
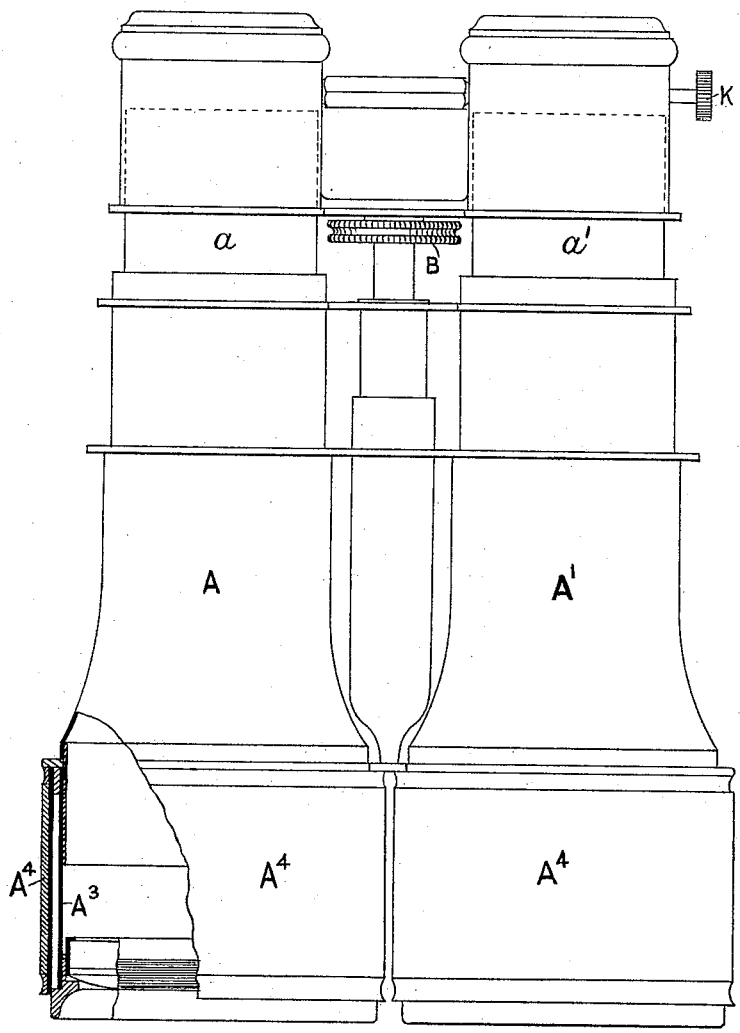

The invention may be described in detail as follows, reference being had to the accompanying drawings, in which;

Figure 1 is a vertical section, partly in elevation, of the camera. Fig. 2 an elevation of one side of the device for carrying the sensitized paper and key for operating the same. Fig. 3 an elevation of the other side of said device. Fig. 4 a sectional plan view through X X Fig. 1. Fig. 5 a plan of the device. Fig. 6 an end elevation of a portion of the sensitized paper carrier, showing the device for locking the measuring roll. Fig. 7 is a perspective view of the measuring roll. Fig. 8 an elevation partly in section of the apparatus when converted into an opera glass.

Referring to Fig. 1;—The tubes $a$ $a'$ are adapted to slide telescopically in the tubes A A' in the usual manner of opera or field glasses, being operated and adjusted simultaneously to the same focus by the milled headed screw B. These tubes may be constructed in the same or nearly the same manner as those of binoculars and are provided with lenses forming the eye and object glasses. The tubes $A''$ and $A'''$ are socketed or screwed on the tubes A' and A, and the former forms the chamber in which the sensitized paper is exposed. L L are the field lenses and L' the eye lens for focusing. The tubes $c$ and $c$ are fastened together and are provided with the field lenses L L aforesaid. They are adapted to be received by the tubes $a$ and $a'$ on which they can be slid on and off at pleasure. The respective lenses are so formed or adjusted that, when an object is focused by the focusing tube, the sensitized surface in the other tube is in the proper focus to receive the image of such light.

Referring now to Figs. 1 to 7 inclusive; The extremity of tube $A''$ is closed by the base plate $D^2$ of the frame D' which supports the paper rolls. The plate $D^3$, which is secured to the frame D' by screws and winged nuts $d'$, has a square or other shaped opening, through which the sensitized paper is exposed. It can be easily removed by rotating the nuts to coincide with the slots $d^2$.

$e$ is the sensitized paper or other suitable material, E the roll containing the supply of sensitized material ready for exposure.

E', $E^2$ are guide rolls and $E^3$ the measuring roll and $E^4$ the take-up roll onto which the sensitized paper is wound after exposure.

F is a spring, which presses on the supply-roll E to prevent the paper being unrolled unless force is applied. The paper or other flexible material $e$ is wound on the roller B, the end is passed round the guide roll E', and along the flat face $e'$ of the frame, so that a portion of its sensitized face, equal to the size of the opening D, will be exposed to the action of light when the shutter is opened. The paper is then passed round the guide-roll $E^2$ and measuring roll $E^3$ to the take-up roll $E^4$ on which the paper is wound after exposure.

G is a toothed wheel or circular rack engaging a bevel wheel G' mounted on the take-up roll $E^4$ and having a hole adapted to receive a key such as H.

$e^2$ is a ratchet wheel on the end of roll $E^4$;

$e^3$ a pawl engaging the teeth thereof, $e^4$ a spring which keeps the pawl in engagement with the teeth of wheel $e^2$. By rotating the toothed wheel G by the key, the sensitized paper is rolled onto the take-up roll $E^4$ from the supply roll E, whereby fresh unexposed portions of the paper are successively presented to the opening D.

I is a pivoted locking lever, the tongues $i$ and $i'$ of which are adapted to engage respectively the slot $e^5$ of the measuring roll $E^3$ and the teeth of the bevel wheel $G'$ and prevents (while in engagement) the measuring and take up rolls $E^3$ and $E^4$ rotating, and in conjunction with the ratchet wheel $e^2$, pawl $e^3$ and spring F, keeps the sensitized paper drawn tight, so as to maintain a flat surface to the opening D, free from creases or wrinkles.

$i^2$ is a spring, the tendency of which is to keep the said lever in the slot $e^5$ and prevent it accidentally falling out of engagement therewith. One corner of slot $e^5$ is rounded off as a cam to permit the tongue of lever I to mount the end of the measuring roll $E^3$ when force is exerted to rotate the latter in one direction; the other side of slot being square prevents the said roll $E^3$ rotating the other way. The circumference of said roll is approximately equal to the length of opening D. On the other end of said roll is the sloping surface J.

$J'$ is a rotatable spindle having a projecting tooth $j$ and a coiled spring $j'$ which retains the tooth normally in the position shown. When the spindle is rotated by a key inserted from the outside, the tooth passes through the slot $j^2$ in the frame and presses upon the inclined plane of the surface J thereby rotating the measuring roll sufficiently to cause the locking lever I to mount the end of said roll. The locking lever I being thereby raised, the bevel wheel $G'$ is released from engagement of the tooth $i'$, and the roll $E^4$ can then be rotated to present a fresh surface of sensitized material $e$ for exposure. On one revolution of the roll $E^3$ being completed, the tooth $i$ of the locking lever drops into the slot $e^5$ of the roll $E^3$, and the tooth $i'$ into one of the teeth of bevel wheel $G'$, thus locking the roll $E^4$ and indicating to the operator that an entirely fresh portion of sensitized paper has been placed under the opening D ready for the next exposure, and the portion last exposed moved away where it cannot receive the actinic rays. The roll $E^4$ cannot again be rotated until the bevel wheel is released in the manner already described.

The mode of action is as follows: The operator directs the lenses L L toward the object, and locates it by looking through the eye lens in the tube $A'''$. He obtains the proper focus by adjusting the milled head B until distinct vision is obtained. The telescopic tube A is thereby simultaneously adjusted to the same focus. By means of a suitable exposing device a ray of light is admitted from the object to the sensitized surface in the interior. When the exposure is completed, and the picture of the object produced, the take-up roll $E^4$ is rotated by the key inserted from the outside of apparatus, thereby rolling the paper on to the take-up roll $E^4$ from the roll E and presenting a fresh surface beneath the opening D ready for the next exposure. The locking lever I indicates when enough of the sensitized paper has been rolled on to the roll $E^4$ from the supply-roll E to present a fresh surface beneath the opening D, as by the automatic locking of the measuring roll $E^3$ and of the bevel wheel $G'$, on completion of one revolution of roll $E^3$, further movement of the mechanism is prevented, until it is again released in the manner already described. By my invention, long focus lenses can be used, thus taking pictures at very long distances, securing large detail, very true focusing and a faithful representation of the picture seen through the opera glass. The length of exposure is regulated by the judgment of the operator, as already explained.

To change the camera into an opera or field glass, the tubes $A''$ and $A'''$ are taken off tubes A and $A'$, together with the frame $D'$ with its paper rolls and the eye lens which the said tubes respectively contain. Tubes $A^3$ with ordinary object lenses are put on instead, as shown in Fig. 8. $A^4$ are hoods capable of being drawn out to shade the object glasses. The tubes $c$ and $c$ containing the object lenses, are also taken off and eye pieces of any usual kind put on in their place, or, if desired, three kinds of eye glasses may be used, adapted respectively for opera, field or marine purposes, either of which can be brought into use by rotating the milled head K.

I claim as my invention;—

1. In a photographic camera, the combination of a film take-up or winding roll, a measuring roll rotated by the movement of the film and having a cam shoulder, as that of the slot $e^5$, a wheel $G'$ rotating in unison with the winding and measuring rolls, a self-acting locking device to engage both the measuring roll, and the wheel $G'$, and thus lock the winding and measuring rolls against rotation, at predetermined intervals of rotation of the measuring roll, and to be disengaged by the said cam-shoulder, and a device applied to the measuring roll to turn the same so as to operate the said releasing cam-shoulder.

2. In a photographic camera, the combination of a film take-up or winding roll, a measuring roll rotated by the movement of the film having a slot $e^5$, a toothed wheel $G'$ geared to the winding roll, and a spring-actuated locking-bar carrying teeth $i\ i'$ to engage simultaneously the slot $e^5$ and the teeth of the wheel $G'$ so as to lock the winding and measuring rolls against rotation in both directions.

3. In a photographic camera, the combination of a film take-up or winding roll, a measuring roll rotated by the movement of the film having a slot $e^5$, toothed gear wheels G G' connected with the winding roll to revolve the same, and a spring-actuated locking bar to engage simultaneously the slot $e^5$ and the gear teeth of one of the wheels G G' to lock the winding and measuring rolls against rotation.

4. In a photographic camera, the combination of a frame D', a film take-up or winding roll $E^4$, a roll $E^3$ rotated by the movement of the film having a cam-shoulder, a wheel G' connected and rotating in unison with the rolls $E^4$ and $E^3$, a self-acting locking device to engage both the roll $E^3$ and the wheel G' and lock the rolls $E^4$ and $E^3$ against rotation, and to be disengaged by the said cam-shoulder, and a starting device, to turn the roll $E^3$ and operate said releasing cam-shoulder, comprising a projection J on the roll $E^3$, and a spindle J' on the frame D' having an arm to engage or be disengaged from the projection J at will.

5. In a photographic camera, the combination of a frame D', a roll $E^3$ rotated by the movement of the film having a cam-shoulder, a locking device to engage the roll $E^3$ and be disengaged therefrom by said cam-shoulder, a starting device, to turn the roll $E^3$ and operate said releasing cam-shoulder, comprising an inclined plane J on the roll $E^3$ and a spindle capable of being rotated on the frame D' by a key and having an arm to engage the inclined plane J.

In testimony whereof I have signed my name to this specification in the presence of two subscribing witnesses.

WILLIAM SANDERS.

Witnesses:
GEO. C. DYMOND,
H. P. SHOOBRIDGE.